United States Patent [19]

Knaepen

[11] Patent Number: 4,999,064
[45] Date of Patent: Mar. 12, 1991

[54] PROCESS FOR PRODUCING WEATHER RESISTANT CONSTRUCTION ELEMENTS

[75] Inventor: Marc Knaepen, Landen, Belgium

[73] Assignee: Exxon Chemical Patents, Inc., Linden, N.J.

[21] Appl. No.: 356,783

[22] Filed: May 24, 1989

Related U.S. Application Data

[63] Continuation of Ser. No. 877,253, Jun. 23, 1986, abandoned.

[30] Foreign Application Priority Data

Jun. 28, 1985 [GB] United Kingdom ............... 85-16480

[51] Int. Cl.$^5$ ....................... B32B 17/00; B32B 23/08; D04H 1/02
[52] U.S. Cl. .................... 156/62.2; 156/221; 264/112; 427/408; 428/512
[58] Field of Search ...................... 156/62.2, 220, 224, 156/221; 264/109, 112, 119; 427/214, 212, 408; 428/40, 142, 205, 511, 512, 513; 525/139

[56] References Cited

U.S. PATENT DOCUMENTS

| 3,895,153 | 7/1975 | Johaston et al. | 156/220 |
| 3,968,316 | 7/1976 | Jyo et al. | 428/511 |
| 4,012,350 | 3/1977 | Burke, Jr. et al. | 525/139 |
| 4,055,453 | 10/1977 | Tajima et al. | 428/40 |
| 4,145,240 | 3/1979 | Polzin | 156/224 |
| 4,396,566 | 8/1983 | Brinkkmann et al. | 264/112 |
| 4,514,442 | 4/1985 | Crepeau | 428/142 |

FOREIGN PATENT DOCUMENTS

| 1150465 | 7/1983 | Canada . |
| 0009053 | 9/1978 | European Pat. Off. . |
| 1015836 | 1/1966 | United Kingdom . |

Primary Examiner—Michael W. Ball
Assistant Examiner—Louis Falasco

[57] ABSTRACT

In a one step process a body of woodchips or lignocellulosic fibres impregnated with a heat curable polar resin adhesive is contacted with EP(D)M rubber sheet containing peroxide curative and subjected to hot pressing. The rubber is thereby cured and caused to convulcanize and adhere to the woodchips to produce a weather resistant construction element.

20 Claims, No Drawings

PROCESS FOR PRODUCING WEATHER RESISTANT CONSTRUCTION ELEMENTS

This is a continuation of application Ser. No. 877,253, filed Jun. 23, 1986.

This invention relates to weather resistant construction elements comprising a woodchip or lignocellulosic fibre substrate having a vulcanised elastomeric outer layer. In particular, the invention is concerned with a process for producing such construction elements which have the elastomeric layer more securely adhered to the substrate than has hitherto been possible.

The principle of producing weather resistant panels or mouldings having protective elastomeric layers is known from EP 9053 and CA 1 150 465, the teachings of which are incorporated herein by reference.

According to EP 9053, a process for producing weather resistant panels or mouldings which consist of wood particles mixed with binding agents, of fibres containing lignocellulose or of raw materials prepared in another way and which are pressed together under the influence of heat, is characterised in that before hot pressing a covering layer made of vulcanisable elastomeric materials, such as natural and/or synthetic rubber or the like, is applied to the topside and/or underside of the cake of chips which has been formed from the wood particles, fibres containing lignocellulose or raw materials prepared in another way, whereupon hot pressing is carried out with simultaneous vulcanising of the covering layers. Panels or mouldings produced in this way are characterised by a permanently elastic covering layer which is connected intimately to the chip body and which is fully vulcanised. Such panels or mouldings may be coloured and/or provided on the outer surface of the elastic layer with grooves or grains or other patterns. Furthermore, the elastic layer may incorporate a reinforcement in the form of a web or fabric.

According to the above prior art, many wood fibre materials for the building industry are limited to interior use since they are not sufficiently weather resistant to be used externally. Such materials, for example particle boards, fibre boards or insulating boards are cheap, light and insulating and so are ideal building components; however, a problem facing the building industry has been the requirement of providing necessary weather resistance and ageing stability to the materials. Modification by glues, hydrophobic agents or antibacterial agents have not provided realistic solutions from an economic or practical viewpoint. More recent developments such as applying to the materials layers of synthetic resin-soaked papers, sheet metals, asbestos cement or synthetic foils have also proved unsatisfactory, since these tend to peel off the substrate under the influence of the weather (temperature variations, radiation and moisture).

The solution proposed by the art specifically mentioned above provides a building board which is said to be economical to produce, weather resistant, substantially non-ageing, embrittling or cracking, and which has high abrasion-resistance, impact resistant capacities and can be made substantially non-inflammable. Indeed, the general teaching of the art is to provide a woodchip or lignocellulosic substrate including a curable resin binding agent, coated with a weather resistant elastomeric material, the elastomeric material being in vulcanised form and being both adhered to one surface of the base material (substrate) and penetrated and impregnated into that surface of the base material. The art teaches the use of a natural vulcanisable rubber or a synthetic vulcanisable rubber as the elastomeric material. Such rubbers may also include stabilising agents and further additives so as substantially to reduce the brittleness and cracking thereof under the influence of rain, ozone, light radiation, UV radiation and heat radiation. The elastomers may also be modified by altering the chemical composition and the type and quantity of added fillers. This, though, is as far as the prior art disclosure of suitable elastomeric layers goes. It is said that the essence of the prior art technique is the fact that the elastomeric coating penetrates into the substrate wood fibres in a single production run, without the need of adhesive agents, thus the process comprises substantially simultaneously compressing the particles of the woodchip or lignocellulose substrate and hardening the adhesive agents (binding agents) contained therein and compressing and vulcanising the covering layer of natural rubber and/or synthetic rubber or other elastomer. The elastomer coating may be applied by spraying, pouring, sprinkling, painting, or it may be applied in the form of a self-supporting film, that is a rubber sheet.

The disclosures of EP 9053 and CA 1 150 465 would see to be a general teaching of the technique to be used. However, the publications are notably silent on the particular substrate and elastomer types which are to be used in order to give the most desired properties in the finished product. Indeed, the elastomer layer is simply said to be natural or synthetic rubber; and the binding agent for the substrate is said only to be a curable resin. No specific materials are mentioned, and such general description encompasses a whole range of possibilities which may be more or less useful to the construction industry.

After extensive investigations into possible combinations of systems which may be employed, a particular combination which has been shown to give surprisingly good results as measured in terms of the degree to which the elastomer layer remains fixed to the substrate, has now been found. This combination of features involves the selection of an appropriate rubber type, an appropriate curative system for the rubber and an appropriate binding agent for the substrate, the particular combination being nowhere suggested in the prior art referred to above, and being one which gives surprisingly good results.

Thus, according to the present invention there is provided a process for producing a weather resistant construction element by contacting a body of woodchips or lignocellulosic fibres impregnated with a binding agent, with a layer of vulcanisable synthetic elastomeric material and subjecting the assembly to hot pressing so as simultaneously to compress the body, harden the binding agent and vulcanise the elastomeric material, characterised in that the binding agent comprises a heat-curable polar resin adhesive and the vulcanisable elastomeric material comprises (a) a copolymer rubber of ethylene and at least one other alpha-olefin and/or a terpolymer rubber of ethylene, at least one other alpha-olefin, and a minor proportion of at least one copolymerisable polyene and (b) a peroxide curative system for the rubber, present in an amount effective to vulcanise the rubber under the applied hot press conditions.

The copolymer is preferably an ethylene-propylene copolymer. The terpolymer is preferably an ethylene-propylene-diene terpolymer, commonly called EPDM, and preferably contains from 1 to 10 wt. % of diene, such as 1,4 hexadiene, dicyclopentadiene, vinylidenenorbornene, or an alkylidenenorbornene, for example methylenenorbornene or ethylidenenorbornene. Such copolymer or terpolymer may be the only rubber in the elastomeric material, but in a preferred embodiment the elastomeric material comprises a blend of the copolymer and the terpolymer. The proportions of such blend may be adjusted to take account of the cost and other characteristics of the rubbers. As used herein, the term EP(D)M is intended to mean the broad terpolymers as defined above, the broad copolymers as defined above, and blends thereof. Minor amounts of other rubbers such as butyl or halogenated butyl rubber may also be incorporated; the amount and nature of these additional rubber components will depend on the particular applications for which the end product is intended, since each will introduce to the elastomeric layer its particular characteristics. For example the presence of halogenated butyl rubber will reduce the overall permeability of the cured elastomer layer to moisture and gases. Preferably, when present at all, the amount of rubber other than terpolymer is from 5 to 50 more preferably 10 to 25 phr, based on the (combined) weight of terpolymer and/or copolymer.

The elastomer layer of the finished product is preferably substantially completely vulcanised, since this will confer on the construction element characteristics of elastomeric behaviour and resistance to external factors which is characteristic of EP(D)M. However, it is not only the terpolymer and/or copolymer which confers such character on the layer, but also the curative system. Numerous curative systems are known for the specified copolymer and/or terpolymer, which for convenience hereinafter will be referred to as EP(D)M, but it has been necessary to select a specific curative, namely peroxide systems, to achieve the degree of EP(D)M curing (and hence resistance) coupled with adhesion to the substrate which is required by the building industry of construction elements. Thus, certain phenol resins and sulphur-based systems are known to be effective to cure EP(D)M, but extensive investigation has shown it to be necessary, in accordance with the present invention, for the curative system employed to be peroxide-based. Without wishing to be bound by theory, it is believed that the combination of peroxide-based rubber curative (free radical system) and heat-curable polar resin adhesive used as binding agent in the woodchip or lignocellulosic fibres gives particularly advantageous results from the hot press technique for producing the construction element, because free radicals produced by the peroxide system serve to promote bonding not only as crosslinks within the EP(D)M, but also as chemical bonds between the rubber molecule chains and the polar resin binding agent. Thus, the physical penetration and impregnation of the elastomer layer into the substrate, as disclosed in the prior art, is, by virtue of the particular rubber/curative/binding agent system selected, enhanced by chemical bonding, so making an extremely strong contact between the elastomeric layer and the substrate. In other words, the selection of the peroxide curative (especially in the proportion specified hereinafter) and the heat curable polar resin results in a synergistic combination which is surprisingly effective in producing products useful in the builing industry with EP(D)M rubber under the specified process conditions.

It has been found that the physical penetration of the rubber into the substrate can be enhanced by appropriate selection of the viscosity thereof under the applied temperature conditions. Thus, for example, the elastomer layer preferably has a Mooney viscosity (ML (1+8) at 140° C.) of from 14 to 200, more preferably 20 to 140 and most preferably 50 to 90.

Many peroxide-based curative systems are known for EPDM and similar terpolymer and copolymer systems, and by way of example there may be mentioned. aromatic or aliphatic peroxides such as the aromatic diacyl peroxides and aliphatic diacyl peroxides, dibasic acid peroxides, ketone peroxides, alkyl peroxyesters, alkyl hydroperoxides, e.g. diacotylperoxide, dibenzoylperoxide, bis-2,4-dichlorobenzoyl peroxide, ditert.- butyl peroxide, dicumylperoxide, tert.-butylperbenzoate, tert.-butylcumyl peroxide, 2,5-bis-(tert.-butylperoxy)-2,5-dimethylhexane, 2,5-bis-(tert.-butylperoxy)-2,5- dimethylhexyne-3; 4,4,4', 4(-tetra-(tert.-butylperoxyisopropyl)-benzene, 1,1-bis-(tert.-butylperoxy)-3,3,5-trimethylcyclohexane, lauroyl peroxide, succinic acid peroxide, cyclohexanone peroxide, ter.-butyl peracetate bis(-tert. butyl peroxyisoproyl)benzene, 4,4-di tert. butyl peroxy n-butyl valerate and butyl hydroperoxide.

The amount of peroxide curative system present in the elastomeric material is selected to provide the degree of curing of the terpolymer which is required. Thus, preferably the elastomeric material comprises from 2 to 20, parts by weight of peroxide curative system per 100 parts by weight of terpolymer and/or copolymer (phr), since this range has been found, in the practice of the process of the invention, to give a good cure of the elastomer layer under routinely appropriate hot press conditions and in combination with the designated binding resin in the woodchip or fibre. More preferably from 5 to 15 phr peroxide, especially 8 to 12 phr are employed in accordance with the invention. Hereinafter, unless otherwise stated, parts are parts by weight.

The peroxide is a radical source, and it is believed that good bonding between the elastomer layer and the substrate is obtained because there is an affinity between the free radical containing molecules induced in the elastomer and the polar resin adhesive in the woodchips or lignocellulosic fibres, which polar resins harden under the applied temperature and pressure conditions by a condensation reaction.

The heat-curable polar resin binding agent may be, for example, a melamine-formaldehyde resin, an isocyanate resin, a urea-formaldehyde resin or a phenolformaldehyde resin.

The amount of binding agent employed will be consistent with amounts as conventionally used in the chipboard and fibreboard production industry; indeed it is an advantage of the process of the invention that the improved coated boards can be made on a standard production line without the board manufacturer having to adjust the nature or proportions of the materials which he routinely employs. It is the nature of the rubber and curative system which has been selected by the applicants to provide a particularly good combination which is useful in the construction industry.

Other components may be incorporated in the elastomeric material in order to give desirable properties to the finished construction element. Thus, it is advantageous to incorporate additives such as stabilisers or flame retardants. A particular combination of stabiliser and flame retardant has been found to perform very well with the systems necessarily present in the product formed by the process of the invention. Thus, it is especially preferred that the vulcanisable elastomeric material used in the process includes a stabiliser/flame retardant system comprising titanium dioxide and aluminium trihydroxide, preferably at least 30 phr titanium dioxide and at least 150 phr aluminium trihydroxide.

Preferably the elastomeric material comprises from 30 to 100 phr, more preferably from 40 to 60 phr of titanium dioxide. It is preferred that the aluminium trihydroxide content be in the range 150 to 400 phr, more preferably 180 to 250 phr. It is believed that the titanium dioxide functions both as a long-term UV stabiliser, and also a white filler, whereas the aluminium trihydroxide functions as a flame retardant. Of course these additives may be incorporated independently or not at all, depending on the end use which is envisaged for the final product. Other flame retardant additives such as chlorinated or brominated products, antimony oxide and certain phosphorus compounds may be incorporated as an alternative or in addition, if required.

In a preferred embodiment, the process of the invention is conducted by applying a self-supporting film or sheet of the elastomeric material to the body of woodchips or lignocellulosic fibres (which may if required be to an extent pre-compressed). To facilitate sheet formation, the elastomeric material preferably includes a plasticizer which ideally is free of impurities such as sulphur or polycyclic aromatics. The plasticiser may be, for example, a phthalate (e.g. DINP or DIDP) or alkylate or adipate or a normal paraffinic or naphthenic oil, and may be incorporated in an amount for example up to 200 phr. Amounts of from 10 to 40 phr are particularly preferable for the adipates or phthalates since amounts of these plasticizers above 40 phr carry with them a danger that the plasticizer might exude onto the surface of the elastomeric material. The other plasticizers mentioned above may be used in higher amounts since they are extremely compatible with EP(D)M. In addition to the optional stabilisers flame retardants and plasticizers mentioned above, it is preferred to include in the elastomeric material a short term UV stabiliser, for example in amounts of from 0.1 to 2 phr, more preferably 0.4 to 1 phr. Such stabilisers may be a combination of components, for example those sold under the trade names Irganox and Tinuvin.

Optionally, the elastomeric material may contain a reinforcer, and here silica is preferred, for example in amounts of from 10 to 100 phr, more preferably 20 to 30 phr. In this case, it is desirable to incorporate a buffer designed to reduce the effect of acid fillers such as silica. For example, mono-, di- or tri-ethylene glycol or triethanolamine may be incorporated. Such buffers are preferably present in amounts of from 0.5 to 20 phr, more preferably 1 to 10 phr.

Optionally, the elastomeric material may contain a for example zinc oxide or magnesium oxide or antioxidants as free radical scavengers, preferably in amounts of from 3 to 20, more preferably 5 to 10 phr for metal oxides, and/or 1 to 10 phr, more preferably 1 to 5 phr for anti-oxidants. In addition, or in the alternative, processing aids such as low density polyethylene or stearic acid may be incorporated. For example, stearic acid may be present in amounts of from 0.5 to 10, more preferably 1 to 3 phr; whilst LDPE may be present in amounts of for example from 2 to 50, more preferably 5 to 15 phr. It may also be desirable to incorporate a coupling agent, for example one based on a silane such as vinyl silane, which will serve to couple the copolymer and/or terpolymer to the various filling ingredients which may be present. The coupling agent is preferably present in amounts of from 0.5 to 10, more preferably 1 to 2 phr.

In a particularly preferred embodiment, the process is carried out using a preformed sheet of elastomeric material comprising EPDM terpolymer rubber and, in parts by weight per 100 parts by weight of said rubber from 2 to 20, more preferably 5 to 15 phr peroxide curative system; from 30 to 100, more preferably 40 to 60 phr titanium dioxide; from 150 to 400, more preferably 180 to 250 phr aluminium trihydroxide; from 0 to 200, more preferably 10 to 40 phr impurity-free plasticizer; from 10 to 100, more preferably 20 to 30 phr silica; from 3 to 20, more preferably 5 to 10 phr zinc oxide; from 2 to 50, more preferably 5 to 15 phr LDPE; from, 0.5 to 10, more preferably 1 to 3 phr stearic acid; from 0.5 to 10, more preferably 1 to 2 phr vinyl silane; and from 0.5 to 20, more preferably 1 to 10 phr glycol.

As will be appreciated by those skilled in rubber technology, if the elastomer layer is "black", then no special additive will be required as precaution against UV degradation and discoloration due to oil in the compound. However these may become important in the elastomer materials used for the production of construction elements which present a white or coloured surface.

The operating techniques by which the process of the present invention may be conducted are well described in EP 9053 and CA 1 150 465. For example, the construction elements produced may be in substantially planar form, or they may be in the form of mouldings, optionally with corners in which the elastomeric layer acts as a hinge. Such configurations may be useful in certain aspects of the building industry for construction elements. All such shapes and configurations are intended to be included within the scope of construction elements which may be produced in accordance with the present invention. Moreover, the elastomeric layer may be coloured by addition of suitable colouring agents. Furthermore, the elastomeric layer may have or may be provided during the hot pressing stage, with a grooved, grained or otherwised patterned outer surface. Indeed, more than one surface of the finished product may be provided with the elastomeric layer. Thus, the body of woodchips or lignocellulosic fibres may have the vulcanisable synthetic elastomeric material applied to more than one or all of its surfaces prior to hot pressing.

The hot pressing step is performed in equipment which is substantially the same as that employed in producing chipboard or fibre board. The pressure applied, temperature of operation and the time at which heat and pressure are applied will be adjusted so as to give the required curing of the binding agent in the body of woodchip or lignocellulosic fibres; appropriate compaction of such chips or fibres into the required shape of the construction element; and the required degree of vulcanisation of the elastomeric material. Production of such construction elements may be in a batch-wise manner or may be on a continuous line, as will be well understood by those skilled in the art. It is preferred that, in order to give the required degree of physical penetration of the elastomeric material into the body of chips or fibres, in conjunction with the advantageous degree of chemical bonding between the curing binding agent and the peroxide induced radicals in the rubber/curative system, it is preferred that in performance of the process of the invention, the assembly be subjected to a pressure of from 1000 to 10000 kPa more preferably from 2000 to 6000 kPa. The temperature at which the process is carried out is preferably from 135 to 250° C., more preferably from 170 to 220° C. The period over which the pressure is applied may be, for example, from 2 to 20, more preferably 5 to 15 minutes.

It is a preferred characteristic of construction elements produced by the process according to the present invention that the elastomeric layer not only provides good weather resistance, but also is extremely firmly affixed to the substrate. Thus, preferably the components employed are selected and the hot pressing is carried out such that the vulcanised elastomeric layer of the construction element produced has a peel strength of at least 1 kg/cm, more preferably at least 1.5 kg/cm and most preferably at least 2 kg/cm. Such peel strength is measured in accordance with (ASTM D 816).

Construction elements produced by the process of the present invention may be employed, as is envisaged in EP 9053 and CA 1 150 465, in buildings, constructions, furniture or architectural features which require walls or facias or other components having long-lasting weather resistant properties, and which are further characterised by being substantially lighter than comparable walls or facias made from conventional materials.

It may be desirable for certain end-uses that the final product has a coating comprising foamed rubber. Accordingly in this case the layer of vulcanisable synthetic elastomer material desirably also includes a blowing agent and an activator therefore; in performing the process of the invention the hot pressing then not only vulcanises the rubber but also initiates foaming therein to yield a product comprising a construction element coated with a firmly adhering foamed rubber layer.

EXAMPLE 1

A vulcanisable elastomeric composition 1 having the formulation (in parts by weight) as listed in Table 1 was prepared by the following technique. First the filler and plasticizer components were mixed in an internal mixer (15 litre capacity, Banbury type) at 40–50° C. After 30 seconds' mixing, both elastomeric polymers (EPM and EPDM) were added, together with all other components eXcept the curatives. The mixing chamber was then closed and the mixing was continued with heating of the chamber until after 4–5 minutes the temperature had reached 150° C.±10° C. At this stage the mixture was dumped on to a mill and sheeted out to a thickness of 1.5 cm, the sheets then being allowed to cool to room temperature.

In a second pass through the internal mixer, the sheet was introduced into the chamber at 40–50° C. and the curatives were added. Mixing and heating was continued over 1–2 minutes until a temperature of 90–100° C. had been reached. The mixture was then dumped onto the mill and sheeted to a thickness of 1.5 cm, followed by cooling to room temperature. Thereafter the sheet was calendered to a desired thickness of 1.0 mm, the rubber at this stage still not being in the cured state, but being intended for curing in a subsequent hot pressing stage when applied to an unformed chipboard mass. However, to determine the physical properties of the final product coating, a sample of the thus-formed sheeting was press cured at 50 kg/cm², 180° for 8 minutes and the cured product was tested as discussed hereinafter.

The components used in producing the above composition were as follows:

(1) EPDM = VISTALON 7000 of Essochem, and ethylene/propylene/diene terpolymer rubber of Mooney ML(1+8) at 127° C. = 55, 70 wt. % ethylene content and high diene content
(2) EPM = VISTALON 504 of Essochem, an ethylene/propylene copolymer rubber of Mooney ML (1+8) at 127° C. = 25; 50 wt. % ethylene content
(3) Filler (a) = Martinal OL 111 Aluminium trihydroxide
(4) Filler (b) = KS 300 reinforcing silica filler
(5) Stabilizer = diiso decyl phthalate (DIDP)
(6)–(8) Stabilizers (a),(b),(c) = titanium dioxide, Tinuvin 770 and Irganox B215 UV stabilizers, respectively
(9)–(11) Process aids (a),(b),(c) = Allied Chemicals low density polyethylene ACPE 617A; stearic acid; and polyethylene glycol 4000 respectively
(12) Activator = triallylcyanurate, a peroxide activator
(13) Zinc Oxide
(14) Coupling Agent = Union Carbide vinyl silane A172, for coupling fillers and polymers
(15) Curative (a) = Trigonox 29/40 MB of Akzo (1,1-di-tert butyl-peroxy - 3,3,5 trimethyl cyclohexane in a masterbatch with EPDM, peroxide content 40wt. %.

The cure characteristics of the sheet compound, as measured on a Monsanto oscillating rheometer of arc±5 at 180° C., were as follows:

| ML minimum | 21 pound/inches |
| MH maximum | 116 pound/inches |
| $ts_2$ scorch | 0.35 minutes |
| $tc_{90}$ cure | 1.05 minutes |

The characteristics of the press cured sheeting were as follows:

| Shore A hardness | 80 | ASTM D 2240 |
| 100% modulus (MPa) | 4.4 | ASTM D 412 |
| 300% modulus (MPa) | — | " |
| Tensile strength (MPa) | 5.6 | " |
| Elongation at break (%) | 233 | " |

The uncured sheeting produced as described above was placed onto an uncured woodchip cake in which the woodchips were impregnated with Koramin, a heat-curable, polar melamine resin of BASF. The cake comprised 85 wt. % wood chips (coarse, particle size 0.5–2cm) and 15 wt. % resin. This composite was then placed in a standard chipboard press and subjected to applied pressure (35 kg/cm²) and elevated temperature (200° C.) for 2–3 minutes to produce a cured rubber coated chipboard of dimensions 1.25 m × 2.40 m × 16 mm thick. Samples of this coated chipboard, designated (1a), were then subjected to a peel test in accordance with ASTM D816, on strips 6.5 cm wide, the measurements being made at room temperature on an Instron tensile tester and the results are shown in Table 2.

The sheet composition of this Example was used in identical manner to produce a second cured rubber coated chipboard, designated (1b), but this time the woodchips employed were fine, having a particle size less than 0.2 cm. Again, a sample of the resultant coated chipboard was peel tested and the results are shown in Table 2.

EXAMPLE 2 (comparison)

The process described for Example 1 was repeated for the formulation of composition 2 as shown in Table 1. However compared with composition 1: the EPDM was VISTALON 7507 of Essochem, an ethylene/-propylene/diene terpolymer rubber of Mooney ML(1+8) at 127° C.=50, 50 wt. % ethylene content and high diene content; and the coupling agent was mercapto silane A 189 of Union Carbide. The principle difference, however, was that a different (sulphur) curative package was used, of the following formulation

| | | |
|---|---|---|
| Sulphur | 1.5 | |
| MBT | 1.5 | (mercapto benzothiazole) |
| TMTDS | 0.8 | (tetra methyl thiuram disulphide) |
| ZDBDC | 1.5 | (zinc dibutyl dithiocarbamate) |
| (PXN) | 1.0 | (Vulcacit P extra N, zinc ethyl phenyl dithiocarbamate) |

The sample of composition 2 had the following cure characteristics as measured on the same Monsanto oscillating rheometer at ±5 arc and 180° C.

| | |
|---|---|
| ML minimum | 17 pound-inches |
| MH maximum | 130 pound-inches |
| $ts_2$ scorch | 0.70 minutes |
| $tc_{90}$ cure | 6.50 minutes |

A sample of composition 2 was press cured at 50 kg/cm² and 180° C. for 8 minutes and evaluated as follows:

| | | |
|---|---|---|
| Shore A hardness | 73 | ASTM, D 2240 |
| 100% modulus (MPa) | 3.9 | ASTM D 412 |
| 300% modulus (MPa) | 5.9 | " |
| Tensile strength (MPa) | 6.5 | " |
| Elongation at break (%) | 381 | " |

The sheet form composition 2 was applied in identical manner as with composition 1 of Example 1 to produce two samples of coated chipboard designated (2a) and (2b) being based on the same course and fine woodchip respectively. The samples were subjected to identical peel tests as those of Example 1 and the results are shown in Table 2.

TABLE 1

| Composition | 1 | 2 |
|---|---|---|
| (1) EPDM | 25 | 100 |
| (2) EPM | 75 | — |
| (3) Filler (a) | 180 | 180 |
| (4) Filler (b) | 20 | 20 |
| (5) Plasticizer | 20 | 20 |
| (6) Stabilizer (a) | 40 | 40 |
| (7) Stabilizer (b) | 0.3 | 0.3 |
| (8) Stabilizer (c) | 0.15 | 0.15 |
| (9) Process aid (a) | 10 | 10 |
| (10) Process aid (b) | 1 | 1 |
| (11) Process aid (c) | 3 | 3 |
| (12) Activator | 1 | — |
| (13) Zinc oxide | 5 | 5 |
| (14) Coupling agent | 2 | 2 |
| (15) Curative (a) | 14 | — |
| (16) Curative (b) | — | 6.3 |

TABLE 2

| Composition | Peel Strength (kg/cm) | Failure |
|---|---|---|
| 1a | 2.5 | break |
| 1b | 2.2 | break |
| 2a | 1.4 | pull |
| 2b | 1.0 | pull |

With reference to Table 2 it may be seen that chipboards 1a and 1b produced by the process of the invention have considerably improved integrity compared with those produced using a standard sulphur curative which is not synergistic in the system with the designated polar adhesive resin employed to cure the chips of the chipboard itself. Furthermore it is noted that chipboards 1a and 1b both failed by breakage of the rubber (that is, the bond was stronger than the rubber) compared with chipboards 2a and 2b where the rubber pulled away from the main mass of chipboard.

I claim:

1. A process for producing a weather resistant construction element comprising contacting a body of woodchips or lignocellulosic fibres impregnated with a binding agent, with a layer of vulcanisable synthetic elastomeric material thereby forming an assembly and subjecting said assembly to hot pressing so as simultaneously to compress said body, harden the binding agent and vulcanise the elastomeric material, characterised in that the binding agent comprises a heat-curable polar resin adhesive and the vulcanisable elastomeric material comprises (a) a copolymer rubber of ethylene and at least one other alpha-olefin and/or a terpolymer rubber of ethylene, at least one other alpha-olefin and a minor proportion of at least one copolymerisable polyene and (b) a peroxide curative system for the rubber, present in an amount effective to vulcanise the rubber under the applied hot press conditions.

2. A process according to claim 1, wherein the peroxide curative system is present in an amount of from 2 to 20 parts by weight per 100 parts by total weight of copolymer and terpolymer rubber (phr).

3. A process according to claim 1, wherein the peroxide curative system comprises an aliphatic peroxide.

4. A process according to claim 1, wherein the peroxide curative system is selected from bis(tert. butyl peroxy isopropyl) benzene and dicumyl peroxide.

5. A process according to claim 1, wherein the polar resin adhesive comprises a phenol-formaldehyde resin.

6. A process according to claim 1, wherein the polar resin adhesive is selected from melamine-formaldehyde resins, isocyanate resins and urea-formaldehyde resins.

7. A process according to claim 1, wherein the elastomeric material is selected from EPDM terpolymers, EPM copolymers and mixtures thereof.

8. A process according to claim 7, wherein the elastomeric material comprises a blend of an ethylene-propylene-monomer (EPM) copolymer rubber and an ethylene-propylene-diene (EPDM) terpolymer rubber.

9. A process according to claim 1, wherein the elastomeric material comprises a butyl or halogenated butyl rubber in addition to the copolymer and/or terpolymer.

10. A process according to claim 1, wherein the vulcanisable elastomeric material additionally includes a stabiliser/ flame retardant system comprising titanium dioxide and aluminium trihydroxide.

11. A process according to claim 1, wherein the hot pressing is carried out at a temperature of from 135 to 250° C.

12. A process according to claim 1, wherein hot pressing is carried out at a pressure of from 1000 to 10000 kPa.

13. A process according to claim 1, wherein hot pressing is carried out in a manner such that the vulcanised elastomeric layer of the construction element produced has a peel strength of at least 1.5 kg/cm (ASTM D 816).

14. A process according to claim 13, wherein the peel strength is at least 2 kg/cm.

15. A process according to claim 1, wherein the elastomeric material includes an additive selected from plasticizers, UV stabilizers, silica reinforcers, heat stabilizers, free radical scavengers, coupling agents, processing aids, colouring agents, acidity buffers and mixtures thereof.

16. A process according to claim 1, wherein the body is substantially flat and the layer of vulcanisable synthetic elastomeric material is applied to both planar surfaces thereof prior to hot pressing.

17. A process according to claim 1, wherein the vulcanisable synthetic elastomeric material is applied to substantially all the surfaces of the body.

18. A process according to claim 1, wherein the elastomeric layer has, or is provided during the hot pressing with, a grooved, grained or otherwise patterned outer surface.

19. A process according to claim 1, wherein the sheet of elastomeric material comprises EPM copolymer rubber and/or EPDM terpolymer rubber and, in parts by weight per 100 parts by total weight of said rubber; from 2 to 20 parts peroxide curative, from 30 to 100 parts titanium dioxide, from 150 to 400 parts aluminium trihydroxide from 0 to 200 parts impurity free plasticizer, from 10 to 100 parts silica, from 3 to 20 parts zinc oxide, from 2 to 50 parts low density polyethylene, from 0.5 to 10 parts stearic acid, from 0.5 to 10 parts vinyl silane and from 0.5 to 20 parts of a glycol.

20. A process for producing a weather resistant construction element by contacting a body of woodchips or lignocellulosic fibres impregnated with a binding agent, with a layer of vulcanisable synthetic elastomeric material and subjecting the assembly to hot pressing so as simultaneously to compress the body, harden the binding agent and vulcanise the elastomeric material, wherein the binding agent comprises a heat-curable polar resin adhesive, the vulcanisable elastomeric material comprises (a) an elastomer selected from EPM copolymers, EPDM terpolymers and mixtures thereof and (b) from 2 to 20 parts by weight of a peroxide curative system for the elastomer based on 100 parts by weight of elastomer, and the hot pressing is carried out at 135–250° C. and 1000–10000 kPa to produce a construction element having a vulcanised layer with a peel strength of at least 1.5 kg/cm measured according to ASTM 816.

* * * * *